(12) United States Patent
Chiesa et al.

(10) Patent No.: US 12,497,353 B2
(45) Date of Patent: Dec. 16, 2025

(54) PROCESS FOR THE PURIFICATION OF (R)-2-AMINO-3-PHENYLPROPYL CARBAMATE

(71) Applicant: FLAMMA SPA, Chignolo d'Isola (IT)

(72) Inventors: Francesco Chiesa, Ceranova (IT); Leila Vahdati, Isso (IT); Mario Scotti, Abbiategrasso (IT); Daniela Comi, Cisano Bergamasco (IT); Paolo Cremonesi, Melzo (IT); Maria Argese, Sedriano (IT); Massimo Verzini, Caldiero (IT); Wei He, Dalian (CN)

(73) Assignee: FLAMMA SPA, Chignolo d'Isola (IT)

( * ) Notice: Subject to any disclaimer, the term of this patent is extended or adjusted under 35 U.S.C. 154(b) by 394 days.

(21) Appl. No.: 18/008,828

(22) PCT Filed: Jun. 9, 2021

(86) PCT No.: PCT/EP2021/065403
§ 371 (c)(1),
(2) Date: Dec. 7, 2022

(87) PCT Pub. No.: WO2021/250067
PCT Pub. Date: Dec. 16, 2021

(65) Prior Publication Data
US 2023/0242476 A1    Aug. 3, 2023

(30) Foreign Application Priority Data

Jun. 10, 2020 (IT) .................. 102020000013855

(51) Int. Cl.
C07C 269/08    (2006.01)
C07C 271/12    (2006.01)

(52) U.S. Cl.
CPC .......... *C07C 269/08* (2013.01); *C07C 271/12* (2013.01)

(58) Field of Classification Search
None
See application file for complete search history.

(56) References Cited

U.S. PATENT DOCUMENTS

| 5,955,499 | A  | 9/1999 | Choi et al. |
| 2005/0080268 | A1 | 4/2005 | Choi et al. |
| 2008/0090902 | A1 | 4/2008 | Pandey et al. |

FOREIGN PATENT DOCUMENTS

| WO | 2018/048871 | 3/2018 |
| WO | 2020/035769 | 2/2020 |

OTHER PUBLICATIONS

European Medicines Agency ("Note for Guidance on Impurities in New Drug Products" (CPMP/ICH/2738/99), Jun. 2006) (Year: 2006).*
International Search Report (ISR) issued Dec. 10, 2021 in International (PCT) Application No. PCT/EP2021/065403.
Written Opinion of the International Searching Authority issued Dec. 10, 2021 in International (PCT) Application No. PCT/EP2021/065403.
Raymond C. Rowe et al., "Handbook of Pharmaceutical Excipients", Sixth Edition, 2009.
P. Heinrich Stahl et al., "Handbook of Pharmaceutical Salts—Properties, Selection, and Use", WILEY-VCH, 127-133, 2008.
"ICH guideline Q3C (R6) on impurities: guideline for residual solvents", European Medicines Agency, Aug. 9, 2019.

* cited by examiner

*Primary Examiner* — Amy C Bonaparte
(74) *Attorney, Agent, or Firm* — Wenderoth, Lind & Ponack, L.L.P.

(57) ABSTRACT

The present invention relates to a process for the purification of (R)-2-amino-3-phenylpropyl carbamate in perspective of the subsequent conversion in the corresponding HCl salt (SOLRIAMFETOL). The invention further relates to the process for preparing a batch of purified solriamfetol, as well as to the purified (R)-2-amino-3-phenylpropyl carbamate or its hydrochloride salt.

17 Claims, No Drawings

PROCESS FOR THE PURIFICATION OF (R)-2-AMINO-3-PHENYLPROPYL CARBAMATE

TECHNICAL FIELD

The present invention relates to a process for the purification of (R)-2-amino-3-phenylpropyl carbamate in perspective of the subsequent conversion in the corresponding HCl salt (SOLRIAMFETOL).

The invention further relates to the process for preparing a batch of purified solriamfetol, as well as to the purified (R)-2-amino-3-phenylpropyl carbamate or its hydrochloride salt.

BACKGROUND OF THE INVENTION

SOLRIAMFETOL is a drug used in the treatment of excessive sleepiness associated with narcolepsy.

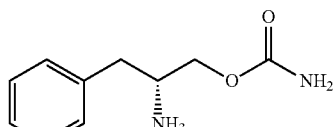

SOLRIAMFETOL

WO2018/048871 discloses a newly identified solvate form of (R)-2-amino-3-phenylpropyl carbamate (APC) hydrochloride, a method of preparing APC hydrochloride, and methods of using the same to treat disorders. WO2018/048871 also discloses a method of preparing APC hydrochloride while minimizing contamination with 2-chloropropane, the method comprising crystallizing APC in the presence of aqueous HCl, thereby producing crystals of APC hydrochloride.

WO2020/035769 discloses a process for the preparation of solriamfetol or novel salts thereof. More particularly WO2020/035769 discloses solriamfetol dibenzoyl-D-tartaric acid salt or solriamfetol di-p-toluoyl-D-tartaric acid salt and their process for preparation.

It is known that the quality of APIs (Active Pharmaceutical Ingredient) used for human application must be compliant with ICH guideline, in term of quality and manufacturing procedures.

The content of each impurity, in absence of specific toxicological data, is strictly limited and, for such reason, during the development of the process, lot of efforts are just focused on purification methods of the final API.

In addition if the process is aimed at an industrial application, not only the quality but also aspects of economy, health and safety, scalability and environmental impact must be considered as driven forces for the process development.

The quality of SOLRIAMFETOL depends on the synthetic process applied, the possible side reactions occurring and the potential degradation pathways of the molecule.

SOLRIAMFETOL is generally prepared starting from D-Phenylaninol (COMPOUND 1) or from N-protected derivatives (COMPOUND 2):

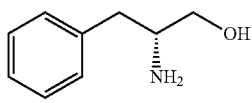

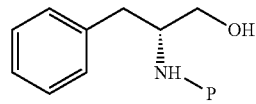

These compounds are reacted with a possible source of the carbamoyl fragment, such as sodium cyanate (Route of synthesis 1), as described in US2005/0080268, or phosgene/NH3 (Route of synthesis 2), as described in U.S. Pat. No. 5,955,499, to form the API or its precursor.

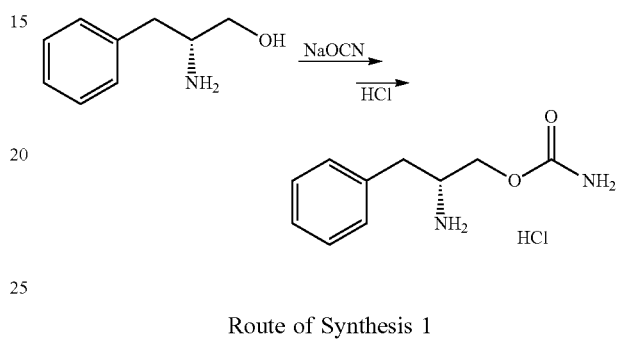

Route of Synthesis 1

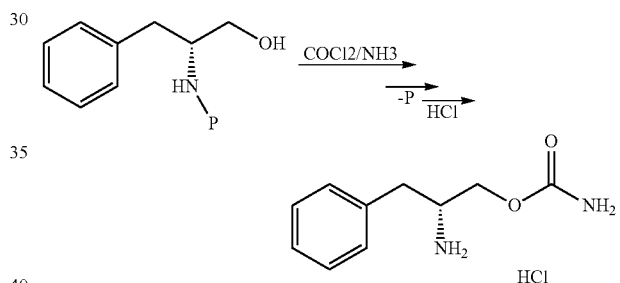

Route of Synthesis 2

Unreacted starting material D-Phenylalaninol, (compound 1) represents one of the main impurities potentially affecting the final API.

One of the other most common and critical impurities can be formed is the BIS ADDUCTED derivative, (2R)-2-amino-3-phenylpropyl (aminocarbamoyl) carbamate (compound 3):

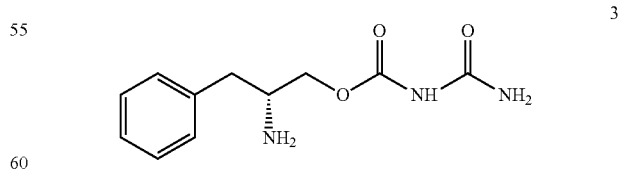

BIS ADDUCTED derives from a second addition of the carbamoyl function to the just formed API skeleton.

At the end of the reaction, the presence of Phenylalaninol and BIS ADDUCTED are strictly correlated, because the attempt to push the conversion to completeness by using an excess of reagents, allows a complete consumption of the starting materials but inevitably has the consequence of increasing the content of BIS ADDUCTED. On the other hand, decreasing the excess of the reagents to limit the formation of BIS ADDUCTED generally leads to larger amount of residual starting material, compound 1.

As described in US2008/0090902, in addition to process impurities, there are lot of impurities that can be formed by degradation phenomena related to the API.

For example, the treatment of the API at basic pH allows apparently the migration of the carbamoyl group from the oxygen to the nitrogen of the molecule, leading to the formation of the ureidic derivative UREA impurity, 1-hydroxymethyl-2-phenyl-ethyl urea (compound 4):

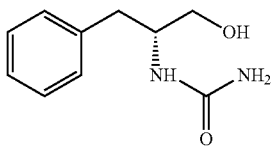

4

Such phenomena regard BIS ADDUCT impurity as well, that can be converted to the corresponding BIS ADDUCT UREA, N-1-hydroxymethyl-2-phenyl-ethyl-N'-aminocarbamoyl urea (compound 5):

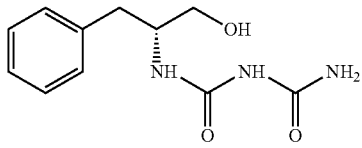

5

That means the presence of BIS ADDUCT UREA is correlated to the presence of BIS ADDUCT impurity.

At lower pH another possible degradation mechanism can take place, causing the loss of ammonia and the intramolecular formation of a 5-member cycle derivative, CYCLE impurity, 4-benzyl-oxazolidin-2-one (compound 6):

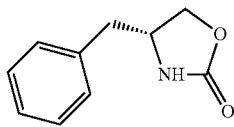

6

Beside organic impurities there are also inorganic by-products which potentially can affect the quality of the final API.

In order to isolate the API and or remove some impurities, it is necessary to work-up the reaction mixture properly.

Water extraction is the commonest and easiest possible work-up approach to remove inorganic by-products, but such operation requires a basic treatment with the aim of keeping the main product in organic phase.

Nevertheless, as previously described, basic condition is responsible of a possible degradation of the molecule. The magnitude of this basic degradation and, therefore, the amounts of UREA and BIS ADDUCT UREA impurities depend on the pH, the temperature and the time of contact.

Usually, the time required for any single operation on industrial manufacturing scale is significantly amplified compared to laboratory scale. Therefore, this degradation phenomena can become not negligible.

UREA, BIS ADDUCT UREA and CYCLE impurities, not having free amino group, cannot be salified with an acid unlike the API. This important difference can be taken into advantage for their removal by solvent extraction and/or crystallization, on the basis of the different water/organic solvent repartition and/or different solubility with respect to the salified API.

On the other hand, maintaining the possibility of being salified with HCl as the main product and, due to their structural similarity with the API, Phenylalaninol and BIS ADDUCT are hard to be efficiently purged by simple crystallization.

For this reason, having a high quality of the product before salification with HCl may be the right approach to reach the target quality for the final compound.

Therefore, the present inventors have developed a method comprising the salification of (R)-2-amino-3-phenylpropyl carbamate with a suitable organic acid able to emphasize the difference in terms of solubility between the product and the salified impurities.

SUMMARY OF THE INVENTION

The object of the invention is to provide a method of purification of (R)-2-amino-3-phenylpropyl carbamate in view of the subsequent conversion into the corresponding HCl salt (SOLRIAMFETOL).

Therefore, in a first aspect, the present invention relates to a process for the purification of crude (R) 2-amino-3-phenylpropyl carbamate comprising the steps of:
a) adding an aliphatic or aromatic monocarboxylic acid to a solution of (R) 2-amino-3-phenylpropyl carbamate so as to obtain the corresponding organic salt;
b) isolating the organic salt by precipitation.

According to a second aspect thereof, the present invention relates to a process for manufacturing (R) 2-amino-3-phenylpropyl carbamate or its hydrochloride salt, which comprises a process for the purification of crude (R) 2-amino-3-phenylpropyl carbamate according to the invention.

According to a third aspect thereof, the present invention relates to a process for preparing a batch of purified solriamfetol, which comprises:
A) analyzing a batch of solriamfetol for the presence of one or more of:
  phenylalaninol (Impurity 1);
  (2R)-2-amino-3-phenylpropyl (aminocarbamoyl) carbamate (Impurity 3);
  N-1-hydroxymethyl-2-phenyl-ethyl-N'-aminocarbamoyl urea (Impurity 5);
B) if the batch does not meet pre-set specification for the amount of one or more of Impurity 1, 3 or 5, further purifying the solriamfetol.

According to a fourth aspect thereof, the present invention relates to purified (R)-2-amino-3-phenylpropyl carbamate or its hydrochloride salt having a purity equal to or greater than 98%, wherein the (R)-2-amino-3-phenylpropyl carbamate or its hydrochloride salt does not contain any of the following impurities at a concentration greater than about 0.15% by weight:
  phenylalaninol (Impurity 1);
  (2R)-2-amino-3-phenylpropyl (aminocarbamoyl) carbamate (Impurity 3);

N-1-hydroxymethyl-2-phenyl-ethyl-N'-aminocarbamoyl urea (Impurity 5).

Definitions

Unless otherwise defined, all terms of art, notations and other scientific terminology used herein are intended to have the meanings commonly understood by those of skill in the art to which this disclosure pertains. In some cases, terms with commonly understood meanings are defined herein for clarity and/or for ready reference; thus, the inclusion of such definitions herein should not be construed to represent a substantial difference over what is generally understood in the art.

The terms "approximately" and "about" herein refer to the range of the experimental error, which may occur in a measurement.

The term "physiologically acceptable excipient" herein refers to a substance devoid of any pharmacological effect of its own and which does not produce adverse reactions when administered to a mammal, preferably a human. Physiologically acceptable excipients are well known in the art and are disclosed, for instance in the *Handbook of Pharmaceutical Excipients*, sixth edition 2009, herein incorporated by reference.

The term "pharmaceutically acceptable salts" refers to those salts having the biological efficacy and properties of the salified compound and which do not produce adverse reactions when administered to a mammal, preferably a human being. The pharmaceutically acceptable salts can be inorganic or organic salts; examples of pharmaceutically acceptable salts include, but are not limited to carbonate, hydrochloride, hydrobromide, sulfate, hydrogen sulfate, citrate, maleate, fumarate, trifluoroacetate, 2-naphthalenesulfonate, and para-toluenesulfonate. More information on pharmaceutically acceptable salts may be found in *Handbook of pharmaceutical salts*, P. Stahl, C. Wermuth, WILEY-VCH, 127-133, 2008, incorporated herein by reference.

The term "aliphatic monocarboxylic acids" refers to short chain acids having 2 to 12 carbon atoms such as butyric acid, propionic acid, trifluoroacetic acid, formic acid, acetic acid and lauric acid.

The term "aromatic monocarboxylic acids" refers to substituted or unsubstituted aromatic monocarboxylic acids such as benzoic acid and its derivatives: $C_1$-$C_4$ mono and dialkyl benzoic acid, alkoxybenzoic acid, hydroxybenzoic acid, nitro benzoic acid, halo-benzoic acid etc.

The terms "halogen" or "halo" herein refer to fluorine (F), chlorine (Cl), bromine (Br), or iodine (I).

The term "$C_1$-$C_4$ alkyl" herein refers to a branched or linear hydrocarbon containing from 1 to 4 carbon atoms. Examples of $C_{1-4}$ alkyl groups include but are not limited to methyl, ethyl, n-propyl, isopropyl, n-butyl, sec-butyl, isobutyl, tert-butyl.

The term "alkoxy" refers herein to 0-alkyl group, wherein "alkyl" is as defined above.

The term "area %" herein refers to area under the curve in the HPLC chromatogram. References herein to percent (%) purity are based on area.

The term "NMT" herein refers to "not more than".

The term "NLT" herein refers to "not less than".

The term "SOLRIAMFETOL" herein refers to (R)-2-amino-3-phenylpropyl carbamate hydrochloride salt.

The term "purified" herein refers to a purity NLT 98% area %.

The term "any single unidentified impurity" refers to any unknown impurity present in (R)-2-amino-3-phenylpropyl carbamate or its hydrochloride salt.

The terms "comprising", "having", "including" and "containing" are to be construed open-ended terms (i.e. meaning "including, but not limited to") and are to be considered as providing support also for terms as "consist essentially of", "consisting essentially of", "consist of" or "consisting of".

The terms "consist essentially of", "consisting essentially of" are to be construed as semi-closed terms, meaning that no other ingredients which materially affects the basic and novel characteristics of the invention are included (optional excipients may thus included).

The terms "consists of", "consisting of" are to be construed as closed terms.

DETAILED DESCRIPTION OF THE INVENTION

An object of the present invention is a process for the purification of crude (R) 2-amino-3-phenylpropyl carbamate comprising the steps of:
  a) adding an aliphatic or aromatic monocarboxylic acid to a solution of (R) 2-amino-3-phenylpropyl carbamate so as to obtain the corresponding organic salt;
  b) isolating the organic salt by precipitation.

Preferably, the aliphatic or aromatic monocarboxylic acid is selected from butyric acid, propionic acid, trifluoroacetic acid, formic acid, acetic acid, lauric acid, benzoic acid, $C_1$-$C_4$ mono and dialkyl benzoic acid, alkoxybenzoic acid, phenylacetic acid, biphenyl-4-carboxylic acid, hydroxybenzoic acid, nitro benzoic acid and halo-benzoic acid. More preferably benzoic acid, $C_1$-$C_4$ mono and dialkyl benzoic acid, alkoxybenzoic acid, phenylacetic acid, biphenyl-4-carboxylic acid, hydroxybenzoic acid, nitro benzoic acid and halo-benzoic acid.

In a preferred embodiment of the process, step a) is performed in a polar solvent or in a mixture of polar solvents, preferably selected from DCM, methanol, ethanol, isopropanol, THF, Methyl-THF, ethyl acetate or isopropyl acetate.

Preferably, step a) is carried out at a temperature from 5 to 80° C. and step b) is carried out at a temperature comprised from 80 to 0° C.

In another preferred embodiment, the molar ratio between (R) 2-amino-3-phenylpropyl carbamate and the aliphatic or aromatic monocarboxylic acid is from 1:0.9 to 1:1.5.

Preferably, the process according to the invention is characterized in that it further comprises a step c) of converting the organic salt into the corresponding hydrochloride salt.

Preferably, the process according to the invention is characterized in that it further comprises drying the organic salt or the hydrochloride salt at a temperature from 20 to 50° C.

A further object of the present invention is a process for manufacturing (R) 2-amino-3-phenylpropyl carbamate or its hydrochloride salt, which comprises a process for the purification of crude (R) 2-amino-3-phenylpropyl carbamate according to the invention.

Another object of the present invention is a process for preparing a batch of purified solriamfetol, which comprises:
  A) analyzing a batch of solriamfetol for the presence of one or more of:
    phenylalaninol (Impurity 1);
    (2R)-2-amino-3-phenylpropyl (aminocarbamoyl) carbamate (Impurity 3);

N-1-hydroxymethyl-2-phenyl-ethyl-N'-aminocarbamoyl urea (Impurity 5);

B) if the batch does not meet pre-set specification further purifying the solriamfetol.

Preferably, the pre-set specification for each of the one or more Impurity 1, 3 or 5 is equivalent to or not more than 0.15% by weight.

Preferably, the pre-set specification includes that the purity of solriamfetol is equivalent to or greater than 98% by area %.

The further pre-set specification includes that the amount of any single unidentified impurity is equivalent to or not more than 0.10% by weight.

In a preferred embodiment of the process for preparing a batch of purified solriamfetol, step A) is carried out by HPLC.

In another preferred embodiment, the further purification in step B) includes:

carrying out the displacement to the (R) 2-amino-3-phenylpropyl carbamate base;

repeating the purification process according to the invention, till matching the pre-set specification.

The pre-set specification is as defined above.

A further object of the present invention is purified (R)-2-amino-3-phenylpropyl carbamate or its hydrochloride salt having a purity equal to or greater than 98% by area %, wherein the (R)-2-amino-3-phenylpropyl carbamate or its hydrochloride salt does not contain any of the following impurities at a concentration greater than about 0.15% by weight:

phenylalaninol (Impurity 1);

(2R)-2-amino-3-phenylpropyl (aminocarbamoyl) carbamate (Impurity 3);

N-1-hydroxymethyl-2-phenyl-ethyl-N'-aminocarbamoyl urea (Impurity 5).

Preferably, the purified (R)-2-amino-3-phenylpropyl carbamate or its hydrochloride salt is characterized by not containing any single unidentified impurity at a concentration greater than about 0.10% by weight.

EXPERIMENTAL PART

Example 1: Synthesis of (R)-2-amino-3-phenylpropyl carbamate

To a solution of D-Phenylalaninol (100.0 g; 0.66 mol) in dichloromethane (2000 mL) is added sodium cyanate (59.1 g; 0.92 mol). The mixture is cooled at 0° C. and methanesulfonic acid (222.5 g; 2.31 mol) is added dropwise maintaining the temperature below 5° C. The reaction mixture is stirred for about 24 h at about 5° C. A solution of sodium hydroxide 10% in water is added maintaining the temperature below 5° C., to the mixture till the pH is stable between 10-12. The organic layer is separated and the water phase is extracted twice with 500 mL of dichloromethane. The organic phases are combined together and washed twice with 500 ml and 100 ml of water.

The final organic phase is distilled under vacuum until residual weight of 2578 g and finally contains of crude (R)-2-amino-3-phenylpropyl carbamate base (116.5 g; 0.60 mol).

Example 2: Synthesis of (R)-2-amino-3-phenylpropyl carbamate hydrochloride salt

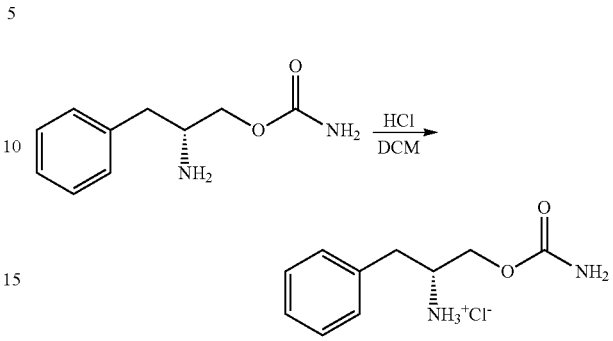

A solution (77 g) of 2-amino-3-phenylpropyl carbamate in DCM (1 eq, 17.8 mmol) obtained in example 1, is added with 30 ml of DCM and heated to 35±2° C. Maintaining the T at 35±2° C., slowly flow anyhydrous HCl till the pH of the mixture decreases to about 1. The mixture is then cooled to 0° C. in about 3 h and stirred at 0° C. for another 2 h. It is then filtered, and the cake obtained is dried under vacuum at 40-45° C. to afford (R)-2-amino-3-phenylpropyl carbamate hydrochloride salt (16.0 mol; Y:89.9%). The resulting solid is subjected to HPLC analysis for purity, indicating a content area % of phenylalaninol Impurity 1 (5.31%), bis-adduct Impurity 3 (2.66%) and bis-adduct urea Impurity 5 (4.60%).

$^1$HNMR (δ ppm): 8.48 (s, 3H), 7.37-7.24 (m, 5H), 6.60 (s, 2H), 4.04-3.99 (dd, 1H), 3.91-3.85 (dd, 1H), 3.59-3.51 (dd, 1H), 3.12-3.06 (dd, 1H), 2.89-2.82 (dd, 1H)

$^{13}$CNMR: 156.55, 136.50, 129.75-127.41, 62.48, 51.65, 35.38

Example 3: General Salification Procedure of CRUDE (R)-2-amino-3-phenylpropyl Carbamate with an Organic Acid A solution in DCM (77 g) containing 2-amino-3-phenylpropyl carbamate crude, obtained in Example 1, (1 eq, 17.8 mmol) is heated to 35±2° C. A mixture of the tested acid (1.1 eq, 19.8 mmol) in DCM (7.78 vol/g, 30 mL) is added in about 1 h, maintaining the T at 35±2° C. The mixture is then cooled to 0° C. in about 3 h and stirred at 0° C. for another 2 h. The suspension obtained is filtered and the cake obtained is washed and dried under vacuum at 40-45° C. to afford the corresponding salt.

The HPLC setup consist of Column USP L11 4.6×150 mm, 3.5 μm particle size; Column temperature 30° C.; Flow rate 1.0 ml/min; Detection UV 210 nm; Run time 25 min; injection Volume 7.0 μL; Mobile phase A: water, pH 2; Mobile phase B acetonitrile with 0.1% strong inorganic acid; gradient

| Flow (mL/min) | Time (min) | A (%) | B (%) |
|---|---|---|---|
| 1.0 | 0.00 | 90.0 | 10.0 |
| 1.0 | 15.00 | 75.0 | 25.0 |
| 1.0 | 25.00 | 10.0 | 90.0 |

Example 4: Synthesis of (R)-2-amino-3-phenylpropyl Carbamate Salts With Aliphatic and Aromatic Monocarboxylic Acids According to the Process of the Invention

Example 4A1: Synthesis of 2-amino-3-phenylpropyl carbamate benzoate salt

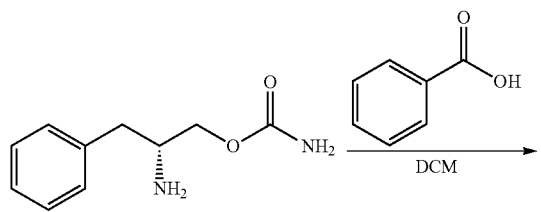

A solution of 2-amino-3-phenylpropyl carbamate in DCM (1 eq, 17.8 mmol), obtained in Example 1, is heated to 35±2° C. A mixture of benzoic acid (1.1 eq, 19.8 mmol) in DCM (7.78 v, 30 mL) is added in about 1 h, maintaining the T at 35±2° C. The mixture is then cooled to 0° C. in about 3 h and stirred at 0° C. for another 2 h. It is then filtered and the cake obtained is dried under vacuum at 40-45° C. to afford benzoate salt (15.5 mmol, Y:87.1%). The resulting solid is subjected to HPLC analysis resulting 99.5% pure (area %).

$^1$HNMR (DMSO-d6) (δ ppm): 7.97-7.93 (m, 2H), 7.51-7.37 (m, 3H), 7.33-7.19 (m, 5H), 7.06 (brs, 3H), 6.59 (brs, 2H), 3.92-3.87 (dd, 1H), 3.83-3.77 (dd, 1H), 3.39-3.31 (m, 1H), 2.79 (d, 2H)

$^{13}$CNMR: 169.23, 157, 138.20, 135.77, 131.37, 129.71-128.36, 126.86, 65.57, 51.72, 38.10

Example 4A2: Synthesis of 2-amino-3-phenylpropyl carbamate benzoate salt

A solution of 2-amino-3-phenylpropyl carbamate in DCM (1 eq; 89.07 mmoll), obtained as in example 1, is analyzed by HPLC resulting with a content area % of 0.76% of Impurity 1, 0.96% of Impurity 3 and 0.75% of Impurity 5. The solution is concentrated to residue and then added with 480 ml of THF. The solution is heated at 50° C. and added with a solution of benzoic acid (1.05 eq; 94.2 mmol) in 30 ml of THF. The mixture is cooled at 0-5° C. for 3 h and maintained at 0-5° C. for at least 2 h. The suspension is filtered, washed with THF and the cake obtained is dried under vacuum at 45° C. to afford (R)-2-amino-3-phenylpropyl carbamate benzoate salt (22 mmol; Y: 81.0%). The resulting solid is analysed by HPLC: Impurities 1-3 and 5 are absent.

Example 4A3: Synthesis of 2-amino-3-phenylpropyl carbamate benzoate salt

A solution of 2-amino-3-phenylpropyl carbamate in DCM (1 eq; 23.4 mmoll), obtained as in example 1, is analyzed by HPLC resulting with a content area % of 7.86% Impurity 1, 0.20% Impurity 3. The solution is concentrated to residue and then added with 23 ml of isopropanol. A solution of benzoic acid (1.1 eq; 25.74 mmol) in 8 ml of isopropanol is added to the mixture and then heated at 60-65° C. to obtain a clear solution. The mixture is cooled at 40° C., added with 50 ml of isopropanol and cooled at 25° C. The suspension was filtered, washed and dried to afford (R)-2-amino-3-phenylpropyl carbamate benzoate salt (14.4 mmol Y: 61.7%). The solid was analysed by HPLC by area % resulting with: 0.20% Impurity 1 and Impurity 3 absent.

Example 4B: Synthesis of 2-amino-3-phenylpropyl carbamate trifluoroacetate salt

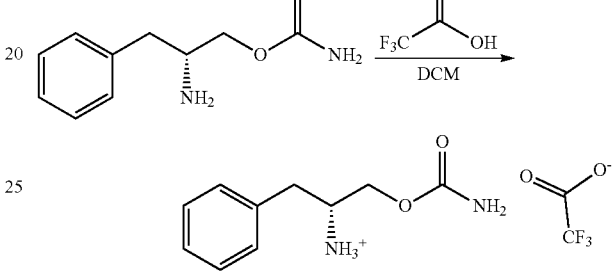

Following the general procedure, trifluoroacetate salt (15.8 mmol, Y:88.7%) is obtained. The resulting solid is subjected to HPLC analysis.

$^1$HNMR (DMSO-d6) (δ ppm): 8.22 (s, 3H), 7.38-7.26 (m, 5H), 6.63 (s, 2H), 4.04-3.99 (dd, 1H), 3.88-3.82 (dd, 1H), 3.64-3.56 (m, 1H), 3.00-2.94 (dd, 1H), 2.88-2.80 (dd, 1H)

$^{13}$CNMR: 159.02-158.60, 156.54, 136.31, 129.72, 129.14, 127.45, 119.66, 115.69, 62.59, 51.57, 35.51

Example 4C: Synthesis of 2-amino-3-phenylpropyl carbamate formate salt

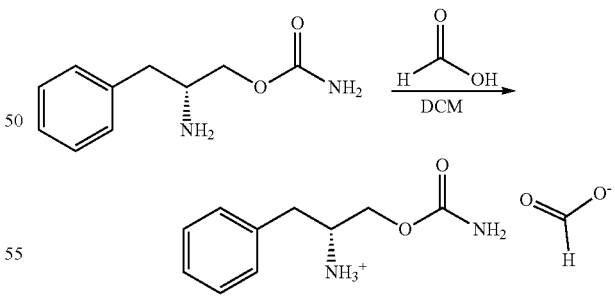

Following the general procedure, formate salt (15.9 mmol, Y:89.3%) is obtained. The resulting solid is subjected to HPLC analysis.

$^1$HNMR (DMSO-d6) (δ ppm): 8.37 (s, 1H), 7.35-7.21 (m, 8H), 6.57 (brs, 2H), 3.91-3.86 (dd, 1H), 3.81-3.75 (dd, 1H), 3.37-3.27 (m, 1H), 2.77 (d, 2H)

$^{13}$CNMR: 165.6, 156.9, 137.97, 129.7, 128.9, 126.94, 65.36, 51.69, 37.91

Example 4D: Synthesis of 2-amino-3-phenylpropyl carbamate acetate salt

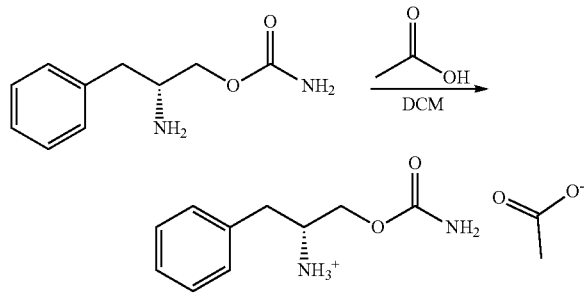

Following the general procedure, acetate salt (15.5 mmol, Y:87,1%) is obtained. The resulting solid is subjected to HPLC analysis.

$^1$HNMR (DMSO-d6) (δ ppm): 7.32-7.18 (m, 5H), 6.50 (brs, 2H), 5.50 (s, 3H), 3.82-3.69 (ddd, 2H), 3.17-3.09 (m, 1H), 2.75-2.69 (dd, 1H), 2.60-2.52 (dd, 1H), 1.88 (s, 3H)

$^{13}$CNMR: 172.89, 157.19, 139.18, 129.68, 128.72, 126.56, 67.69, 51.98, 22.11

Example 4E: Synthesis of 2-amino-3-phenylpropyl carbamate salicylate salt

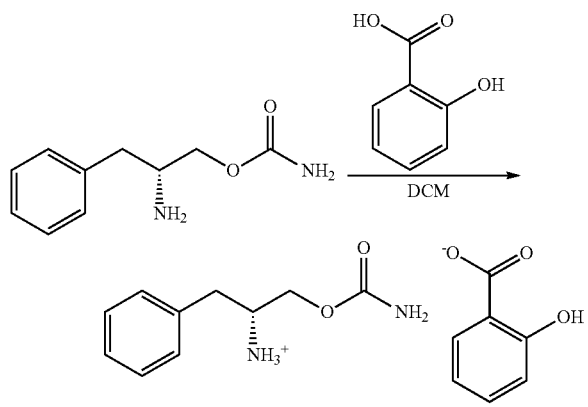

Following the general procedure, salicylate salt (12.7 mmol, Y:71.3%) is obtained. The resulting solid is subjected to HPLC analysis.

$^1$HNMR (DMSO-d6) (δ ppm): 8.39 (brs, 1H), 7.74-7.70 (dd, 1H), 7.37-7.16 (m, 6H), 6.69-6.64 (m, 4H), 4.06-4.00 (dd, 1H), 3.91-3.85 (dd, 1H), 3.67-3.59 (m, 1H), 3.05-2.99 (dd, 1H), 2.90-2.83 (dd, 1H)

$^{13}$CNMR: 172.63, 162.84, 156.60, 136.55, 132.26-127.39, 120.32, 116.93, 116.34, 62.82, 51.55, 35.70

Example 4F: Synthesis of 2-amino-3-phenylpropyl carbamate 4-nitro-benzoate salt Following the general procedure, except for the addition of nitrobenzoic acid as suspension and not as a solution, nitro benzoate salt (17.7 mmol, Y:99,4%) is obtained. The resulting solid is subjected to HPLC analysis.

$^1$HNMR (DMSO-d6) (δ ppm): 8.82-7.65 (brs+d+d, 7H), 7.33-7.25 (m, 5H), 7.06 (brs, 3H), 6.69 (brs, 2H), 4.01-3.96 (dd, 1H), 3.83-3.84 (dd, 1H), 3.60-3.52 (m, 1H), 3.04-2.98 (dd, 1H), 2.88-2.81 (dd, 1H)

$^{13}$CNMR: 167.89, 156.75, 148.77, 144.63, 137.10 130.59, 129.73, 129.03, 127.20, 123.39, 63.51, 51.50, 36.27

Example 4G: Synthesis of 2-amino-3-phenylpropyl carbamate propionate salt

Following the general procedure, propionate salt (15.7 mmol, Y:88,0%) is obtained. The resulting solid is subjected to HPLC analysis.

$^1$HNMR (DMSO-d6) (δ ppm): 7.37-7.16 (m, 5H), 6.53 (brs, 2H), 5.59 (brs, 3H), 3.82-3.69 (ddd, 2H), 3.17-3.09 (m, 1H), 2.75-2.69 (dd, 1H), 2.61-2.54 (dd, 1H), 220-2.13 (q, 2H), 1.00-0.95 (t, 3H)

$^{13}$CNMR: 176.22, 157.20, 139.18, 129.68, 128.72, 126.56, 67.65, 51.96, 28.08, 9.92

Example 4H: Synthesis of 2-amino-3-phenylpropyl carbamate 4-methoxy benzoate salt Following the general procedure, propionate salt (Y:62,5%%) is obtained. The resulting solid is subjected to HPLC analysis.

$^1$HNMR (DMSO-d6) (δ ppm): 7.90-7.88 (d, 2H), 7.33-7.18 (m, 5H), 7.02-6.99 (d, 2H), 6.50 (brs, 2H), 3.80 (s, 3H), 3.78-3.68 (m, 2H), 3.16-3.08 (m, 1H), 2.65-2.69 (m, 1H), 2.59-2.56 (m, 1H)

$^{13}$CNMR: 167.78, 162.94, 157.20, 139.24, 131.70, 129.69, 128.72, 126.55, 124.70, 121.68, 114.09, 67.77, 55.85, 52.00

Example 4I: Synthesis of 2-amino-3-phenylpropyl carbamate 2,4-dimethyl benzoate salt Following the general procedure, 2,4-dimethyl benzoate salt (Y:66,1%) is obtained. The resulting solid is subjected to HPLC analysis.

$^1$HNMR (DMSO-d6) (δ ppm): 7.22-7.20 (d, 1H), 7.33-7.19 (m, 5H), 7.08-7.05 (m, 2H), 6.50 (brs, 2H), 3.82-3.69 (m, 2H), 3.16-3.08 (m, 1H), 2.76-2.69 (m, 1H), 2.60-2.57 (m, 1H), 2.49 (s, 3H), 2.30 (s, 3H).

$^{13}$CNMR: 169.45, 157.20, 141.50, 139.28, 139.23, 132.47, 130.79, 129.68, 129.25, 128.72, 126.74, 126.55, 67.65, 55.38, 52.00, 21.76, 21.31.

Example 4L: Synthesis of 2-amino-3-phenylpropyl carbamate 4-Fluoro benzoate salt Following the general procedure, 4-Fluoro benzoate salt (Y:73,0%) is obtained. The resulting solid is subjected to HPLC analysis.

$^1$HNMR (DMSO-d6) (δ ppm): 8.02-7.95 (m, 2H), 7.33-7.20 (m, 7H), 6.52 (brs, 2H), 3.85-3.71 (m, 2H), 3.24-3.16 (m, 1H), 2.78-2.71 (m, 1H), 2.66-2.59 (m, 1H).

$^{13}$CNMR: 157.09, 138.71, 132.35, 132.23, 129.70, 128.80, 126.72, 115.69, 115.41, 66.74, 60.26, 51.08.

Example 4M: Synthesis of 2-amino-3-phenylpropyl carbamate 4-chloro benzoate salt Following the general procedure, 4-chloro benzoate salt (Y:77,5%) is obtained. The resulting solid is subjected to HPLC analysis.

$^1$HNMR (DMSO-d6) (5 ppm): 7.94-7.91 (d, 2H), 7.53-7.50 (d, 2H), 7.34-7.20 (m, 5H), 6.53 (brs, 2H), 3.87-3.72 (m, 2H), 3.28-3.20 (m, 1H), 2.79-2.62 (m, 2H).

¹³CNMR: 167.22, 156.96, 138.10, 136.62, 133.75, 131.48, 129.71, 128.89, 128.61, 126.91, 65.57, 51.74, 38.08.

Example 4N: Synthesis of 2-amino-3-phenylpropyl carbamate 4-methyl benzoate salt Following the general procedure, 4-methyl benzoate salt (Y:78,9%) is obtained. The resulting solid is subjected to HPLC analysis.
¹HNMR (DMSO-d6) (δ ppm): 7.84-7.82 (d, 2H), 7.33-7.19 (m, 7H), 6.52 (brs, 2H), 3.84-3.71 (m, 2H), 3.22-3.14 (m, 1H), 2.77-2.71 (m, 1H), 2.65-2.58 (m, 1H), 2.36 (s, 3H).
¹³CNMR: 168.37, 157.15, 142.35, 138.95, 130.36, 129.73, 129.69, 129.28, 128.77, 126.64, 67.17, 55.37, 51.92, 21.54.

Example 4O: Synthesis of 2-amino-3-phenylpropyl carbamate biphenyl-4-carboxylate salt Following the general procedure, biphenyl-4-carboxylate salt (Y:82,0%) is obtained. The resulting solid is subjected to HPLC analysis
¹HNMR (DMSO-d6) (δ ppm): 8.02 (d, 2H), 7.78-7.72 (m, 4H), 7.50 (t, 2H), 7.44-7.39 (m, 1H), 7.33-7.19 (m, 5H), 6.51 (bd, 2H), 3.84-3.70 (m, 2H), 3.19-3.13 (m, 1H), 2.77-2.71 (m, 1H), 2.64-2.56 (m, 1H).
¹³CNMR: 168.33, 157.06, 143.70, 139.84, 138.53, 157.06, 143.70, 139.84, 138.53, 130.33, 129.70, 129.50, 128.83, 128.50, 127.36, 126.94, 126.78, 66.37, 51.84, 38.78.

Example 4P: Synthesis of 2-amino-3-phenylpropyl carbamate phenylacetate salt

Following the general procedure, phenylacetate salt (Y:55,4%) is obtained. The resulting solid is subjected to HPLC analysis.
¹HNMR (DMSO-d6) (δ ppm): 7.32-7.21 (m, 10H), 6.50 (br, 2H), 3.82-3.69 (m, 2H), 3.5 (s, 2H), 3.18-3.09 (m, 1H), 2.75-2.69 (m, 1H), 2.61-2.57 (m, 1H).
¹³CNMR: 173.42, 157.18, 139.13, 136.27, 129.80, 129.69, 128.74, 128.58, 126.76, 126.58, 67.58, 51.97, 42.02.

Example 4Q: Synthesis of 2-amino-3-phenylpropyl carbamate laurate salt

Following the general procedure, laurate salt (Y:49,2%) is obtained. The resulting solid is subjected to HPLC analysis
¹HNMR (DMSO-d6) (δ ppm): 7.32-7.18 (m, 5H), 6.48 (br, 2H), 3.80-3.67 (m, 2H), 3.13-3.04 (m, 1H), 2.25-2.48 (m, 2H), 2.17 (t, 2H), 1.50-1.46 (m, 2H), 1.25 (s, 16H), 0.86 (t, 3H).
¹³CNMR: 175.09, 157.25, 139.48, 129.68, 128.68, 126.47, 68.24, 52.06, 34.37, 31.76, 29.47, 29.39, 29.23, 29.17, 29.06, 25.06, 22.56, 14.42.

Example 4R: Synthesis of 2-amino-3-phenylpropyl 2-methyl benzoate salt

Following the general procedure, 2-methyl benzoate salt (Y:84,1%) is obtained. The resulting solid is subjected to HPLC analysis.
¹HNMR (DMSO-d6) (δ ppm):7.72-7.70 (m, 1H), 7.34-7.17 (m, 8H), 6.55 (br, 2H), 3.88-3.74 (m, 2H), 3.32-3.23 (m, 1H), 2.76-2.74 (m, 2H), 2.50 (s, 3H).
¹³CNMR: 170.77, 157.05, 138.53, 138.02, 135.19, 131.35, 130.38, 129.91, 129.70, 128.82, 126.76, 125.84, 66.29, 51.79, 38.71, 21.57.

Example 5: Synthesis of (R)-2-amino-3-phenylpropyl Carbamate Salts With Other Organic Acids Used as Reference Compounds Example 5A: Synthesis of 2-amino-3-phenylpropyl carbamate PTSA salt

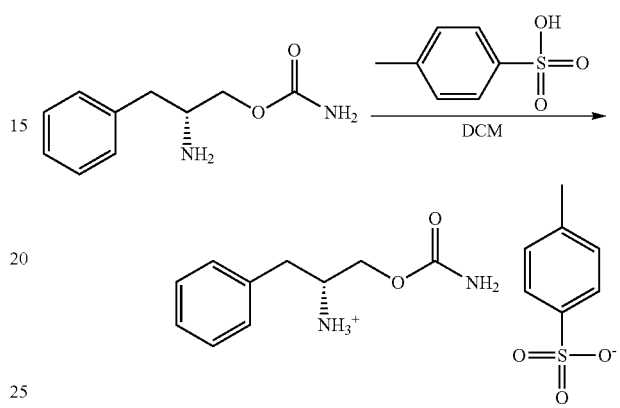

Following the general procedure, PTSA salt (16.9 mmol, Y:95.0%) is obtained. The resulting solid is subjected to HPLC analysis.
¹HNMR (DMSO-d6) (δ ppm): 8.06 (s, 3H), 7.525 (d, 2H), 7.38-7.26 (m, 5H), 7.14 (d, 2H), 6.64 (s, 2H), 4.04-3.99 (dd, 1H), 3.88-3.82 (dd, 1H), 3.62-3.57 (m, 1H), 2.99-2.93 (dd, 1H), 2.87-2.80 (dd, 1H), 2.30 (s, 3H).
¹³CNMR: 156.54, 145.79, 138.38, 136.26, 129-74-125.97, 62.58, 51.63, 35.48, 21.26

Example 5B: Synthesis of 2-amino-3-phenylpropyl carbamate tartrate salt

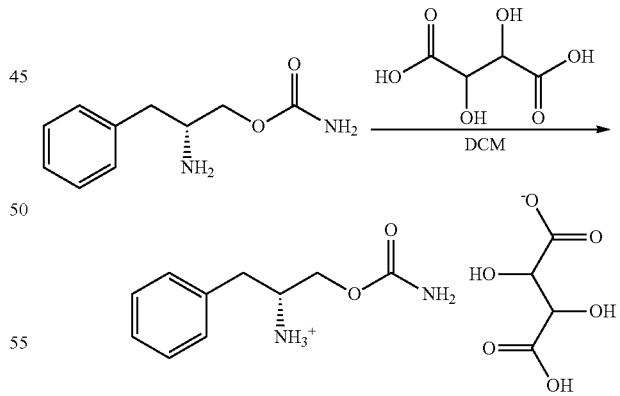

Following the general procedure tartrate salt (15.71 mmol, Y:88.2%) is obtained. The resulting solid is subjected to HPLC analysis.
¹HNMR (DMSO-d6) (δ ppm): 7.88 (brs, 6H), 7.37-7.22 (m, 5H), 6.62 (s, 2H), 4.04 (s, 2H), 4.01-3.95 (dd, 1H), 3.87-3.81 (dd, 1H), 3.59-3.51 (m, 1H), 3.00-2.94 (dd, 1H), 2.86-2.79 (dd, 1H)
¹³CNMR: 174.75, 156.65, 136.76, 129.75-127.31, 72.33, 63.08, 51.52, 35.89

Example 5C: Synthesis of 2-amino-3-phenylpropyl carbamate oxalate salt

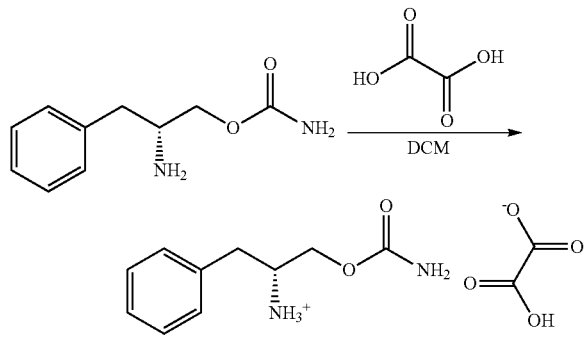

Following the general procedure oxalate salt (17,8 mmol, Y:100%) is obtained. The resulting solid is subjected to HPLC analysis.

$^1$HNMR (DMSO-d6) (δ ppm): 8.12 (brs, 5H), 7.37-7.25 (m, 5H), 6.62 (s, 2H), 4.03-3.97 (dd, 1H), 3.88-3.82 (dd, 1H), 3.62-3.54 (m, 1H), 3.02-2.96 (dd, 1H), 2.87-2.80 (dd, 1H),
$^{13}$CNMR: 163.92, 156.56, 136.43, 129.72-127.42, 62.60, 51.54, 35.50

Example 6: Synthesis of 2-amino-3-phenylpropyl carbamate hydrochloride salt

Procedure a)

A suspension of 2-amino-3-phenylpropyl carbamate benzoate salt (12 g; 37.9 mol) in a mixture of Ethanol (24 ml) and Isopropanol (36 ml) is heated at 65° C. till complete dissolution. A solution of HCl in isopropanol (1.5 eq; 20,7 g) is dropped into the solution obtaining the precipitation of a solid. The suspension is maintained at 65° C. for 1 h and then cooled at 0° C. in 3 h. The solid is filtered under vacuum, washed twice with isopropanol (24 ml×2) and dried under vacuum at 45° C. 2-amino-3-phenylpropyl carbamate hydrochloride salt (7.43 g; 32.2 mmol) is obtained. Residual content of benzoic acid by HPLC is less than 0.15%.

Procedure b)

2-amino-3-phenylpropyl carbamate benzoate salt (10 g; 31.6 mmol) is suspended in isopropyl acetate (100 ml). A solution of HCl in isopropyl acetate (2 eq; 24 ml) is dropped and the suspension is stirred for 4 h. The solid is filtered and washed with isopropyl acetate (20 ml). The wet cake is suspended in isopropyl acetate (70 ml) and stirred for 1 h. The solid is filtered and washed twice with isopropyl acetate (2×20 ml). After drying at 45° C., 2-amino-3-phenylpropyl carbamate hydrochloride salt 6.92 g; 30.0 mmol) is obtained. Residual content of benzoic acid by HPLC is less than 0,15%.

Example 7: Synthesis of 2-amino-3-phenylpropyl carbamate hydrochloride salt

The same procedure of Example 6 may be carried out by using the other organic salts of Example 4, as starting material, instead of benzoate salt.

Example 8: Displacement of the hydrochloride salt to the (R) 2-amino-3-phenylpropyl carbamate base 10 g of 2-amino-3-phenylpropyl carbamate hydrochloride (1 eq; 43 mmol) is dissolved in 30 ml of water and added with 60 ml of DCM. NaOH 10% is added to the mixture till pH 11 and the phases separated. The water phase is extracted twice with 35 ml each of DCM. The organic phases are combined and washed with 5 ml of water. 2-amino-3-phenylpropyl carbamate base (0.95 eq: 41 mmol) in DCM solution is obtained, ready to be converted in the corresponding organic salt according to general procedure described in example 3.

Example 9

Different organic acid have been tested, selecting among aliphatic and aromatic monocarboxylic acids according to the invention, sulphonic and dicarboxylic acids (as reference compounds) and finally on the basis of different pKa.

LIST OF ACID TESTED

1. Benzoic acid
2. Trifluoroacetic acid
3. Formic acid
4. Acetic acid
5. Propionic acid
6. 4-Nitro-benzoic acid
7. 4-methoxy benzoic acid
8. 2.4 dimethyl benzoic acid
9. 4-methyl benzoic acid
10. 4-fluoro benzoic acid
11. 4-chloro benzoic acid
12. Biphenyl-4-carboxylic acid
13. Phenylacetic acid
14. lauric acid
15. 2-methyl benzoic acid
16. p-Toluenesulfonic acid (PTSA)-Reference
17. Salicylic acid
18. L-Tartaric acid-Reference
19. Oxalic acid-Reference
20. Hydrochloride acid-Reference The test was performed starting from a dichloromethane solution of crude (R)-2-amino-3-phenylpropyl carbamate base, obtained from the procedure reported as Example 1.

The solution was divided in equivalent portions. A solution in dichloromethane containing 1.1 eq of each acid tested was added in 1 hour to one portion of the API base solution, maintaining the temperature at 35-40° C. in order to allow the largest dissolution of the forming salt and to maximize the potential purification effect.

The mixture was cooled in 3 h at 0° C. and maintained for 2 h at 0° C. Crystallization occurred over the time. The suspension was filtered and the solid dried under vacuum at 40-45° C. The obtained salts were analyzed by HPLC and the content of each impurity determined by area % normalized with respect to the area % of the API, in order to exclude the contribute in the HPLC trace of each single acid.

Since the stability of the starting dichloromethane solution of (R)-2-amino-3-phenylpropyl carbamate base was rather poor, the composition of such solution was periodically controlled by HPLC in order to have a precise knowledge of the composition of the starting solution, before the salification and be more accurate in the evaluation of the purging factor related to each acid tested.

The data, collected in two experimental sessions are summarized in Table 1 and 2.

TABLE 1

HPLC area % normalized respect the API

| compound | Phenylalaninol | BIS-ADDUCT | BIS-ADDUCT UREA |
|---|---|---|---|
| free base control 1 | 5.57% | 4.15% | 2.74% |
| benzoate | 0.21% | 0.27% | 0.00% |
| trifluoroacetate | 0.73% | 0.81% | 0.24% |
| formate | 1.94% | 1.45% | 0.78% |
| acetate | 1.71% | 0.45% | 0.39% |
| free base control 2 | 5.46% | 3.55% | 3.76% |
| p-toluensulphonate | 4.84% | 3.09% | 3.18% |
| salycilate | 1.58% | 0.85% | 0.96% |
| free base control 3 | 5.49% | 3.29% | 4.19% |
| tartrate | 5.34% | 2.91% | 4.10% |
| oxalate | 5.14% | 3.30% | 2.39% |
| Free base control 4 | 5.53% | 2.72% | 5.19% |
| Hydrochloride | 5.31% | 2.66% | 4.60% |
| Free base control 5 | 4.75% | 2.96% | 2.82% |
| propionate | 2.44% | 1.44% | 2.44% |
| nitrobenzoate | 1.29% | 1.31% | 0.85% |

TABLE 2

HPLC area % normalized respect the API

| compound | Phenylalaninol | BIS-ADDUCT | BIS-ADDUCT UREA |
|---|---|---|---|
| free base control 1 | 2.71% | 2.71% | 2.99% |
| 4-methoxy benzoate | 0.68% | 0.49% | 1.13% |
| 2,4-dimethyl benzoate | 0.33% | 0.23% | 0.52% |
| 4-fluoro benzoate | 0.36% | 0.80% | 0.58% |
| 4-chloro benzoate | 0.28% | 0.18% | 0.49% |
| 4-methyl benzoate | 0.35% | 0.20% | 0.63% |
| Biphenyl-4-carboxylate | 0.57% | 1.05% | 0.39% |
| laurate | 0.38% | 0.29% | 0.67% |
| Phenylacetate | 0.58% | 0.29% | 0.98% |
| Free base control 2 | 2.74% | 1.20% | 5.27% |
| 2-methyl benzoate | 0.42% | 0.21% | 0.60% |
| benzoate | 0.26% | 0.08% | 0.49% |

For each impurity the purging factor was calculated and expressed as percentage ratio between the delta of content in the starting base and the content in the obtained salt, with respect to the starting amount.

The data derived are summarized in Table 3:

TABLE 3

% purging factor

| compound | Phenylalaninol | BIS-ADDUCT | BIS-ADDUCT UREA |
|---|---|---|---|
| Benzoate (invention) | 96.22% | 93.49% | 100.00% |
| salycilate (invention) | 71.02% | 76.11% | 74.32% |
| Trifluoroacetate (invention) | 86.84% | 80.38% | 91.10% |
| Formate (invention) | 65.20% | 65.11% | 71.53% |
| Acetate (invention) | 69.23% | 89.13% | 85.80% |
| Propionate (invention) | 48.63% | 51.35% | 13.48% |
| Nitrobenzoate (invention) | 72.84% | 55.74% | 69.86% |
| 4-methoxy benzoate (invention) | 74.91% | 81.92% | 62.21% |
| 2,4-dimethyl benzoate (invention) | 87.82% | 91.51% | 82.61% |
| 4-fluoro benzoate (invention) | 86.72% | 70.48% | 80.60% |
| 4-chloro benzoate (invention) | 89.67% | 93.36% | 83.61% |
| 4-methyl benzoate (invention) | 87.08% | 92.62% | 78.93% |
| Biphenyl-4-carboxylate (invention) | 78.97% | 61.25% | 86.96% |
| laurate (invention) | 85.98% | 89.30% | 77.59% |
| Phenylacetate (invention) | 78.60% | 89.30% | 67.22% |

TABLE 3-continued

% purging factor

| compound | Phenylalaninol | BIS-ADDUCT | BIS-ADDUCT UREA |
|---|---|---|---|
| 2-methyl benzoate (invention) | 84.67% | 82.50% | 88.61% |
| p-toluensulphonate (reference) | 11.41% | 12.99% | 15.34% |
| Tartrate (reference) | 2.80% | 11.49% | 2.16% |
| Oxalate (reference) | 6.47% | −0.24% | 43.00% |
| Hydrochloride (reference) | 3.86% | 2.26% | 11.22% |

As higher is the purging factor as more efficient is the salification method to remove the impurity.

As previously anticipated, the data showed that the salification with HCl does not allow any useful purging of the impurities.

Table 3 also shows that the salification with sulphonic and dicarboxylic acids does not allow any useful purging of the impurities.

On the contrary, the salification with aliphatic and aromatic mono carboxylic acids, according to the invention, surprisingly leads to the reduction of more than 48% of at least two impurities and that it is even more significant and unexpected if compared with low purging effect demonstrated by all the other organic acids tested.

Preferably, the salification with benzoic acid surprisingly leads to the reduction of more than 93% of each impurity.

The inventors have found that also the derivatives of benzoic acid lead to an effective reduction of each impurity.

In addition, it is important to highlight that the purging effect is achieved with a good recovery of the material, being the yield of the purification close to 85%. This quantitative results makes the process extremely valuable in perspective of an industrial scale application.

For the same perspective the usage, in particular, of benzoic acid has in addition other two important advantages. Firstly, from toxicological point of view this is a reagent extremely safe, largely employed as preservative for food, and that guarantees the health and the safety of the worker employed in the manufacturing of the API, as well as of the patients which will use the final drug.

As well, aliphatic acids such as formic and acetic acid are widespread diffused and employed in the synthesis of active pharmaceutical ingredient as reagent or in most cases as solvent. According to Q3Cguideline of ICH (https://www.ema.europa.eu/en/documents/scientific-guideline/international-conference-harmonisation-technical-requirements-registration-pharmaceuticals-human-use_en-14.pdf) they are classified in class 3 for the organic volatile impurities admitted for pharmaceuticals, therefore they are considered low toxic and of with low risk to human health.

Secondarily, but not for importance, concerning the economical impact of the overall process, the conversion of the salts object of this invention to the final HCl API is simple, fast and potentially extremely efficient.

As a matter of fact organic acids, both aromatic and aliphatic, have pKa definitively lower than HCl and are generally high soluble in the commonest organic solvents.

Both these features make possible the direct displacement of these salts by HCl, without the need to pass through the corresponding base. HCl can be added to a suspension or solution of the organic salt. The displacement spontaneously occurs, salifying the API as hydrochloride and generating free organic acid. Performing this operation in the right solvent where the hydrochloride salt is low soluble and organic acid is soluble the recovery of the API can be practically quantitative and no traces of residual organic acid remains in the isolated product.

The invention claimed is:

1. A process for purifying (R) 2-amino-3-phenylpropyl carbamate comprising the steps of:
   a) adding an aliphatic or aromatic monocarboxylic acid selected from the group consisting of trifluoroacetic acid, lauric acid, $C_1$-$C_4$ monoalkyl benzoic acid, $C_1$-$C_4$ dialkyl benzoic acid, alkoxybenzoic acid, phenylacetic acid, biphenyl-4-carboxylic acid, hydroxybenzoic acid, nitro benzoic acid and halo-benzoic acid to a solution comprising (R) 2-amino-3-phenylpropyl carbamate to form an organic salt of the (R) 2-amino-3-phenylpropyl carbamate; and
   b) precipitating the organic salt to obtain an isolated and purified organic salt of (R) 2-amino-3-phenylpropyl carbamate.

2. The process according to claim 1, wherein the aliphatic or aromatic monocarboxylic acid is selected from the group consisting of $C_1$-$C_4$ monoalkyl benzoic acid, $C_1$-$C_4$ dialkyl benzoic acid, alkoxybenzoic acid, phenylacetic acid, biphenyl-4-carboxylic acid, hydroxybenzoic acid, nitro benzoic acid and halo-benzoic acid.

3. The process according to claim 1, wherein the solution in step a) is comprises a polar solvent or in a mixture of polar solvents.

4. The process according to claim 1, wherein the step a) is carried out at a temperature from 5 to 80° C., and the step b) is carried out at a temperature from 80 to 0° C.

5. The process according to claim 1, wherein the molar ratio between the (R) 2-amino-3-phenylpropyl carbamate and the aliphatic or aromatic monocarboxylic acid in the step a) is from 1:0.9 to 1:1.5.

6. The process according to claim 1, further comprising step c) of converting the organic salt into a hydrochloride salt.

7. The process according to claim 1, further comprising drying the organic salt at a temperature from 20 to 50° C.

8. The process according to claim 3, wherein the polar solvent is at least one selected from the group consisting of DCM, methanol, ethanol, isopropanol, THF, Methyl-THF, ethyl acetate and isopropyl acetate, and mixtures thereof.

9. The process according to claim 6, further comprising drying the hydrochloride salt at a temperature from 20 to 50° C.

10. A process for manufacturing a hydrochloride salt of (R) 2-amino-3-phenylpropyl carbamate, comprising the steps of:
    a) adding an aliphatic or aromatic monocarboxylic acid selected from the group consisting of trifluoroacetic acid, lauric acid, $C_1$-$C_4$ monoalkyl benzoic acid, $C_1$-$C_4$ dialkyl benzoic acid, alkoxybenzoic acid, phenylacetic acid, biphenyl-4-carboxylic acid, hydroxybenzoic acid, nitro benzoic acid and halo-benzoic acid to a solution comprising (R) 2-amino-3-phenylpropyl carbamate to form an organic salt of the (R) 2-amino-3-phenylpropyl carbamate;
    b) precipitating the organic salt to obtain an isolated and purified organic salt of (R) 2-amino-3-phenylpropyl carbamate; and
    c) converting the isolated and purified organic salt into the hydrochloride salt of (R) 2-amino-3-phenylpropyl carbamate.

11. The process according to claim 10, wherein the aliphatic or aromatic monocarboxylic acid is selected from the group consisting of $C_1$-$C_4$ monoalkyl benzoic acid, $C_1$-$C_4$ dialkyl benzoic acid, alkoxybenzoic acid, phenylacetic acid, biphenyl-4-carboxylic acid, hydroxybenzoic acid, nitro benzoic acid and halo-benzoic acid.

12. The process according to claim 10, wherein the solution in step a) comprises a polar solvent or a mixture of polar solvents.

13. The process according to claim 12, wherein the polar solvent is at least one selected from the group consisting of DCM, methanol, ethanol, isopropanol, THF, Methyl-THF, ethyl acetate and isopropyl acetate, and mixtures thereof.

14. The process according to claim 10, wherein the step a) is carried out at a temperature from 5 to 80° C., and the step b) is carried out at a temperature from 80 to 0° C.

15. The process according to claim 10, wherein the molar ratio between the (R) 2-amino-3-phenylpropyl carbamate and the aliphatic or aromatic monocarboxylic acid in the step a) is from 1:0.9 to 1:1.5.

16. The process according to claim 10, further comprising drying the organic salt at a temperature from 20 to 50° C.

17. The process according to claim 10, further comprising drying the hydrochloride salt at a temperature from 20 to 50° C.

* * * * *